United States Patent
Sugaya

(10) Patent No.: US 7,965,632 B2
(45) Date of Patent: Jun. 21, 2011

(54) WIRELESS COMMUNICATION SYSTEM, WIRELESS COMMUNICATION DEVICE AND WIRELESS COMMUNICATION METHOD

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 856 days.

(21) Appl. No.: 10/500,647

(22) PCT Filed: Dec. 9, 2003

(86) PCT No.: PCT/JP03/15738
§ 371 (c)(1),
(2), (4) Date: Jul. 1, 2004

(87) PCT Pub. No.: WO2004/064331
PCT Pub. Date: Jul. 29, 2004

(65) Prior Publication Data
US 2005/0147112 A1 Jul. 7, 2005

(30) Foreign Application Priority Data
Jan. 9, 2003 (JP) .................................. 2003-003568

(51) Int. Cl.
*H04J 3/14* (2006.01)
(52) U.S. Cl. ......................... 370/231; 370/349; 370/474
(58) Field of Classification Search .................. 370/231, 370/235, 236, 277, 310.2, 349, 363, 392, 370/395.51, 418, 445, 447, 448, 521, 335, 370/512, 522, 311; 455/426.2, 115.3; 375/259, 375/150
See application file for complete search history.

(56) References Cited

U.S. PATENT DOCUMENTS

| | | | | |
|---|---|---|---|---|
| 3,832,684 A | * | 8/1974 | Besenfelder | 714/814 |
| 5,592,483 A | * | 1/1997 | Hieda et al. | 370/445 |
| 5,881,055 A | * | 3/1999 | Kondo | 370/311 |
| 6,859,463 B1 | * | 2/2005 | Mayor et al. | 370/445 |
| 7,027,464 B1 | * | 4/2006 | Nakahara et al. | 370/503 |
| 7,099,380 B1 | * | 8/2006 | Feng et al. | 375/150 |

(Continued)

FOREIGN PATENT DOCUMENTS

JP 2001-333080 A 11/2001

(Continued)

OTHER PUBLICATIONS

Supplementary European Search Report EP 03777407, dated Dec. 1, 2010.

*Primary Examiner* — Seema S Rao
*Assistant Examiner* — Leon Andrews
(74) *Attorney, Agent, or Firm* — Lerner, David, Littenberg, Krumholz & Mentlik, LLP

(57) ABSTRACT

An information transmission source forms a transmission packet at a predetermined time unit into which a preamble is inserted and transmits it. The information reception target returns an acknowledge (ACK) packet or a not acknowledge (NACK) packet into which a preamble is inserted. A hidden terminal recognizes that the transmission path is used for data retransmission from when the NACK is received to when the next ACK is received to avoid collisions. Further, when there is transmission data at the information transmission source specified by a beacon signal, it is recognized that the transmission path is used until the next ACK is received. For example, in an ultra wide band communication method, access control is executed while avoiding collisions of communications and a retransmission control is executed.

30 Claims, 10 Drawing Sheets

U.S. PATENT DOCUMENTS

| | | | |
|---|---|---|---|
| 7,133,387 B2 * | 11/2006 | Nakada | 370/335 |
| 2001/0046266 A1 * | 11/2001 | Rakib et al. | 375/259 |
| 2002/0003792 A1 | 1/2002 | Schmidl et al. | |
| 2002/0136189 A1 * | 9/2002 | Sato | 370/343 |
| 2003/0112776 A1 * | 6/2003 | Brown et al. | 370/335 |
| 2004/0052319 A1 * | 3/2004 | Wakamatsu | 375/343 |

FOREIGN PATENT DOCUMENTS

| | | |
|---|---|---|
| JP | 2002-198974 A | 7/2002 |
| KR | 2002-65824 A | 5/2003 |
| WO | 0163839 A2 | 8/2001 |

* cited by examiner

FIG. 8

| PRE-AMBLE | HEADER INFORMATION | | | | PAYLOAD INFORMATION | |
|---|---|---|---|---|---|---|
| | BEA-CON | LEN-GTH | TRANS-MISSION SOURCE ADDRESS | RECEPTION GROUP | HCS | PRIORITIZED TRANSMISSION APPARATUS SPECIFYING INFORMATION | ...... | CRC |

FIG. 9

| PRE-AMBLE | HEADER INFORMATION | | | | PAYLOAD INFORMATION | |
|---|---|---|---|---|---|---|
| | DATA | LEN-GTH | TRANS-MISSION SOURCE ADDRESS | RECEPTION TARGET ADDRESS | HCS | DATA PAYLOAD | CRC |

FIG. 10

| PRE-AMBLE | HEADER INFORMATION | | | | |
|---|---|---|---|---|---|
| | ACK | LEN-GTH | TRANS-MISSION SOURCE ADDRESS | RECEPTION TARGET ADDRESS | HCS |

FIG. 11

| PRE-AMBLE | HEADER INFORMATION | | | | |
|---|---|---|---|---|---|
| | NACK | LEN-GTH | TRANS-MISSION SOURCE ADDRESS | RECEPTION TARGET ADDRESS | HCS |

FIG. 12

| PRE-AMBLE | HEADER INFORMATION | | | | |
|---|---|---|---|---|---|
| | RTS | LEN-GTH | TRANS-MISSION SOURCE ADDRESS | RECEPTION TARGET ADDRESS | HCS |

FIG. 13

| PRE-AMBLE | HEADER INFORMATION | | | | |
|---|---|---|---|---|---|
| | CTS | LEN-GTH | TRANS-MISSION SOURCE ADDRESS | RECEPTION TARGET ADDRESS | HCS |

WIRELESS COMMUNICATION SYSTEM, WIRELESS COMMUNICATION DEVICE AND WIRELESS COMMUNICATION METHOD

TECHNICAL FIELD

This invention relates to a wireless communication system, a wireless communication apparatus, a wireless communication method, and a computer program, for mutual communication among a plurality of wireless stations, and particularly to a wireless communication system, a wireless communication apparatus, a wireless communication method, and a computer program, for effecting access control with avoiding collisions of communication and a retransmission control.

More specifically, the present invention relates to a wireless communication system, a wireless communication apparatus, a wireless communication method, and a computer program, for access control with avoiding collisions of communication and a retransmission control in the ultra-wide band communication system and particularly to a wireless communication system, a wireless communication apparatus, a wireless communication method, and a computer program, for providing an access control with avoiding collisions of communication and a retransmission control with that communication apparatuses being currently non-communicating hold the use condition of transmission path through which data communication or retransmission is executed between other communication terminals.

BACKGROUND ART

Construction of an LAN (Local Area Network) by connecting a plurality of computers provides sharing information such as files and data, sharing peripheral devices such as a printer, and interchanging information such as forwarding electronic mail or data content.

Conventionally, the wired LAN connection with optical fibers, coaxial cables, or twist-pair cables was general. This case requires wiring constructions, which makes it difficult to simply construct a network and makes works for laying cables troublesome. Further, after the construction of a LAN, the length of the cable connected to a device limits the movable range.

Then, wireless LANs draw attention as a system releasing users from the LAN wiring in the wired system. According to the wireless LAN, at operation spaces of offices or the like, most of all part of wiring cables can be omitted, so that communication terminals such as personal computer (PC) can be moved relatively easily. Recently, the demands have remarkably increased with the advance in high speed in the wireless LAN system and lowering the cost. In particular, to construct a small scale of wireless network among a plurality of electronic devices existing around human beings to effect information communication, recently introducing a personal area network (PAN) has been studied. For example, different wireless communication systems are defined using frequency bands for which governmental licenses are not required such as the 2.4 GHz band, the 5 GHz, and the like.

In a communication system constructed of a plurality of terminals, it is known that an access control is necessary to avoid collisions of communication between terminals. The access control in the wireless network includes the channel occupied system such as the FDMA (Frequency Division Multiple Access: Frequency Division Multiple Access), the TDMA (Time Division Multiple Access: Time Division Multiple), the CDMA (Code Division Multiple Access: Code Division Multiple Access), or the channel shared system such as the ALOHA or the CSMA (Carrier Sense Multiple Access: Carrier Sense Multiple Access).

For the packet communication having a high burst characteristic due to random communication demands, the channel shared systems, in which a plurality of terminals share the same frequency channel, are frequently adopted. In this channel shared system, communication requests randomly done from the terminals may cause collisions of signals from a plurality of terminal stations (i.e., transmission at the same time interval). Since the collision will decrease the service quality in communication, as a method for avoiding this, the CSMA/CA (Carrier Sense Multiple Access/Collision Avoidance: Carrier Sense Multiple Access/Collision Avoidance) system is widely adopted.

Further, it is known that "Ad Hoc communication" freely constructing a network within communicable regions of respective wireless communication apparatuses, without proving a specific base station or a control station, is suitable for constructing a small scale of personal area network (PAN). In the Ad Hoc communication system, an access control is also adopted to detect whether own transmission type of transmission does not collide.

Further, in the wireless communication system, a method of inserting a preamble having a known pattern at the top of the packet for synchronization among the communication apparatuses is generally adopted.

For example, a system for wireless communication in which information is superimposed on an extreme week impulse stream draws attention as a wireless communication system realizing a near field ultra high speed transmission and is expected to be actually used. The UWB transmission system includes two types, namely, the DS-UWB system in which a diffusion speed of the information signal of the DS is increased to the upper limit and the impulse-UWB system in which the information signal is formed with an impulse scream having an extremely short period at about hundreds picoseconds. Both systems provide high speed data transmissions by diffusion toward an ultra high frequency band, for example, from 3 GHz to 10 GHz to execute transmission and reception. The occupied bandwidth is that of a GHz-order such that the value obtained by dividing the occupied band width by its center frequency (for example, 1 GHz to 10 GHz) becomes about 1. This has an ultra wide band if it is compared with the band width generally used in the wireless LAN or the like using the so-called W-CDMA or cdma2000 system, SS (Spread Spectrum) or OFDM (Orthogonal Frequency Division Multiplexing) system.

Recently, in IEEE802.15.3, as an access control method for the ultra wide band communication, a data transmission method for a packet structure including a preamble is proposed.

Further, after the transmission of data from an information transmission source communication apparatus, when an information reception target communication apparatus side succeeds in data reception, as an automatic retransmission control method, a method of immediately returning reception confirmation information (immediate ACK) has been generally adopted. In this case, at the information transmission source communication apparatus side recognizes the completion of the data transmission when the immediate ACK can be received within a predetermined interval after the data transmission, but on the other hand, when the immediate ACK cannot be received within the predetermined interval, it recognizes the incompletion of the data transmission. In the case of the latter, a data retransmission process is activated.

Further, in the wireless communication system, as another method to improve a communication quality with avoiding collisions, the RTS/CTS method is given. In this case, before the transmission of the body of the information, the information transmission source communication apparatus transmits an RTS (Request to Send: transmission request). When the information reception target communication apparatus receives this RTS, and if the data reception is possible, a CTS (Clear to Send: confirmation notice) is returned as the response. Then, after establishment of connection between the apparatuses by interchanging the RTS/CTS information, the data transmission is executed.

Here, in the ultra wide band communication mentioned earlier, the communication is executed with extremely weak impulse streams, and thus, it has no specified frequency-like carrier. Thus, there is a problem that it is difficult that the access control method on the basis of the CSMA/CA using the reception electric field intensity information (RSSI) cannot be adopted as it is.

On the other hand, in the reception apparatus, a system can be considered which transmits an access control signal to inform the peripherals about its reception condition during the interval for which the signal directed to own station is received. In this case, the communication apparatus during non-communication state holds the use condition of the transmission path with a lead of the reception of the access control signal.

However, if the use of transmission is notified during communication state, the communication apparatus on the reception side is required to transmit and receive the data at the same time. Further, it is required to transmit the access control signal by using a signal of a different frequency band, changing the diffusion code, or selecting timings with which impulses do not overlap. This makes the control complicated.

Further, in such a wireless communication system as to hold the user of the transmission path on the basis of a preamble signal, if a retransmission control is automatically executed on the basis of presence and absence of return of a reception confirmation information (immediate ACK) within a predetermined interval, other communication apparatuses cannot be known about the start of retransmission as long as the preamble signal once added to the NACK information is not transmitted from the information reception target. Thus, loss of time is expected.

In addition, in the wireless communication system interchanging the RTS/CTS information, it is necessary to undergo a connection procedure between the information transmission source and the signal reception target before the data transmission. Thus, the adoption of a method using the preamble signal corresponding to a redundant time added before a signal will cause a problem that it takes for a long period to conduct the connection procedure.

DISCLOSURE OF THE INVENTION

The object of the present invention is to provide a superior wireless communication system, a wireless communication apparatus, a wireless communication method, and a computer program capable of preferably executing the access control and as well as the retransmission control for avoiding collisions of communication.

A further object of the present invention is provide a superior wireless communication system, a wireless communication apparatus, a wireless communication method, and a computer program, capable of preferably executing a retransmission control in addition to a suitable access control for avoiding collisions of communication in the ultra wide band communication system.

A further object of the present invention is to provide a superior wireless communication system, a wireless communication apparatus, a wireless communication method, and a computer program, capable of providing a suitable access control or a suitable retransmission control for holding the use condition of the transmission path for the data communication or retransmission between other communication terminals by a currently non-communicating communication apparatus.

The present invention is provided in consideration of the above-described problems and its first aspect is a wireless communication system, comprising a plurality of communication apparatuses, for dividing transmission data by a predetermined unit and effecting data transmission, characterized in that a communication apparatus of an information transmission source forms a data packet by inserting a preamble signal into each transmission data to transmit it, and a communication apparatus being not currently communicating recognizes that the transmission path is used for a predetermined interval from when the preamble signal is detected. According to the wireless communication system regarding the first aspect, each communication apparatus can hold the use condition of the transmission path on the basis of the detection of the preamble signal and also in the Ad Hoc communication, it can preferably provide the access control with avoiding collision of communication.

However, the "system" here means an object in which a plurality of apparatuses (or functional modules for providing a specified functions) logically congregating, and thus it is not in question as to whether or not each apparatus or each module exists in a single case.

In the wireless communication system regarding the first embodiment of the present invention, the communication apparatus of the information transmission source constructs a data packet at a predetermined time interval unit and as well as inserts a preamble signal to transmit it. On the other hand, after reception of a data packet the information reception target communication apparatus, in response to correctly receiving the data, generates an ACK information or in response to incorrectly receiving the data, generates an NACK information, forms an ACK or an NACK packet into which the preamble signal is inserted to return it. After that, the above-mentioned information transmission source communication apparatus retransmits the data packet of the above-described predetermined time interval unit only in response to the reception of the NACK packet.

In the case of such an automatic retransmission control, the communication apparatus currently non-communicating state can recognize that the transmission path is used for the data retransmission for the interval from when the detection of the NACK packet to when the detection of the next ACK packet on the basis of the reception of the preamble signal.

Further, other communication apparatuses currently non-communicating state can recognize on the basis of the detection of the preamble signal the termination of the use of the transmission path, because it is supposed that a payload has a predetermined length, when an ACK packet cannot be detected until a predetermined interval elapsed from when the reception of the NACK packet.

Further, the information reception target apparatus may add a beacon signal describing information regarding the communication of which transmission is permitted with priority to the top of the preamble signal to transmit it. The communication apparatus specified by the beacon signal may transmit a data packet of a predetermined unit when the data to be transmitted to the information reception target apparatus exists.

In this case, other communication apparatuses currently non-communicating state can recognize that the transmission path is used for the interval corresponding to the packet length from when the beacon signal is received on the basis of the detection of the preamble signal.

Further, the information transmission source apparatus may transmit a transmission request packet (RTS) into which a preamble signal is inserted when no preamble signal is detected for a predetermined interval. The information reception target communication apparatus may return a confirmation notice packet (CTS) in response to the reception of the transmission request packet (RTS) to start the data transmission through the connection procedure on the basis of the RTS/CTS.

In this case, other communication apparatus currently non-communicating can detect an NACK packet from when the reception of the confirmation notice (CTS) packet to when a predetermined interval elapsed on the basis of the detection of the preamble signal and can recognize the use of the transmission path for the interval up to the detection of the next ACK packet.

As this time, the information above-mentioned transmission source communication apparatus may include an element of the transmission request (RTS) for the next data packet transmission in the data packet when there is subsequent transmission data. Furthermore, the information reception target communication apparatus may include an element of the confirmation notice (CTS) in the ACK packet or the NACK packet corresponding to the received data packet.

In this case, because the connection procedure between transmission apparatus and the reception apparatus on the basis of the RTS/CTS can be included in the net data transmission or the corresponding ACK return though the data packet transmission continues, the redundancy in the connection procedure can be eliminated, and the communication interval necessary for the same data transmission amount can be shortened.

Further, a second aspect of the present invention is a computer program described in a computer-readable format to execute on a computer system a wireless communication process in a wireless network constructed with a plurality of communication apparatus, characterized by comprising:

a buffering step dividing transmission data by a predetermined unit;

a transmission data processing step adding a predetermined preamble signal to the divided data to form a transmission packet;

a preamble detection step detecting a preamble signal on a transmission path;

a transmission step transmitting the formed packet when the preamble signal is not detected at said preamble detection means for a predetermined interval;

a reception step receiving the signal added to the preamble signal in response to the detection of the preamble signal; and a reception data processing step analyzing the information received by said reception step.

The computer program regarding the second aspect of the present invention defines a computer program described in a computer-readable format to execute a predetermined process on a computer system. In other words, installing the computer program regarding the second aspect of the present invention into a computer system exercises a cooperative function on the computer system to provide the same operational effect as the wireless communication system regarding the first aspect of the present invention.

Further objects, features, and advantage effects of the present invention will become more readily apparent from the following detailed description taken in conjunction with the accompanying drawings.

BRIEF DESCRIPTION OF DRAWINGS

FIG. 8 is a drawing illustrating a structure of the beacon signal used in the wireless system regarding an embodiment of the present invention;

FIG. 9 is a drawing illustrating a structure of a data packet signal used in the wireless system regarding an embodiment of the present invention;

FIG. 10 is a drawing illustrating a structure of an ACK packet signal used in the wireless system regarding an embodiment of the present invention;

FIG. 11 is a drawing illustrating a structure of an NACK packet signal used in the wireless system regarding an embodiment of the present invention;

FIG. 12 is a drawing illustrating a structure of a transmission request (RTS) packet signal used in the wireless system regarding an embodiment of the present invention;

FIG. 13 is a drawing illustrating a structure of a confirmation notice (CTS) packet signal used in the wireless system regarding an embodiment of the present invention;

BEST MODE FOR CARRYING OUT THE INVENTION

Hereinbelow will be described an embodiment of the present invention with reference to drawings.

Figure 1:
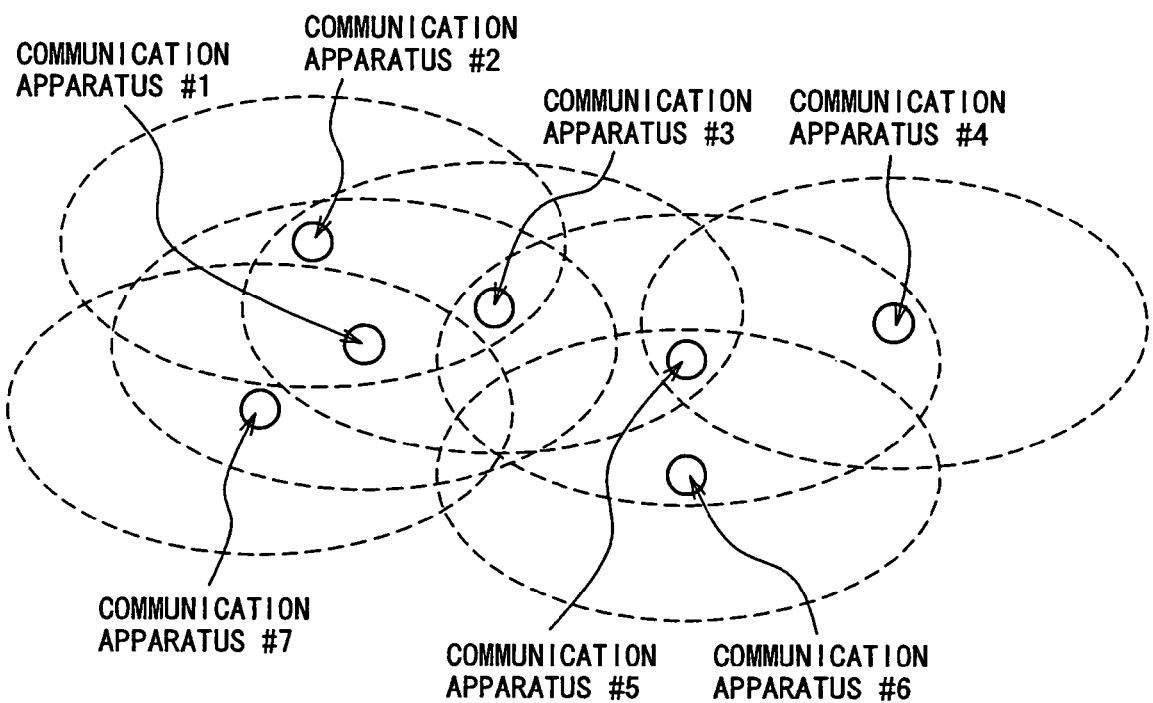
FIG. 1 is a drawing illustrating an arrangement example of communication apparatuses constructing a wireless communication system regarding an embodiment of the present invention.

FIG. 1 shows an arrangement example of communication apparatuses constructing a wireless communication system of an embodiment of the present invention. The same drawing illustrates the condition in which a communication apparatus #1 to a communication apparatus #7 are distributed on the same space.

The broken lines in the same drawing show communication areas of respective communication apparatuses in which each of the communication apparatus is mutually communicable with other communication apparatuses existing within the area and also provides interference at the area.

That is, in the example shown in FIG. 1, the communication apparatus #1 exists at an area communicable with the adjacent communication apparatuses #2, #3, and #7. The communication apparatus #2 exists at an area communicable with the adjacent communication apparatuses #1 and #3. The communication apparatus #3 exists at an area communicable with the adjacent communication apparatuses #1, #2, and #5. The communication apparatus #4 exists at an area communicable with the adjacent communication apparatus #5. The communication apparatus #5 exists at an area communicable with the adjacent communication apparatuses #3, #4, and #6. The communication apparatus #6 exists at an area communicable with the adjacent communication apparatus #5. The communication apparatus #7 exists at an area communicable with the adjacent communication apparatus #1.

As described later, according to the present invention, each communication apparatus establishes the access control by using one wireless transmission path in a time-divisional manner in consideration of mutual influence with other communication apparatuses existing around the communication apparatus.

Figure 2:
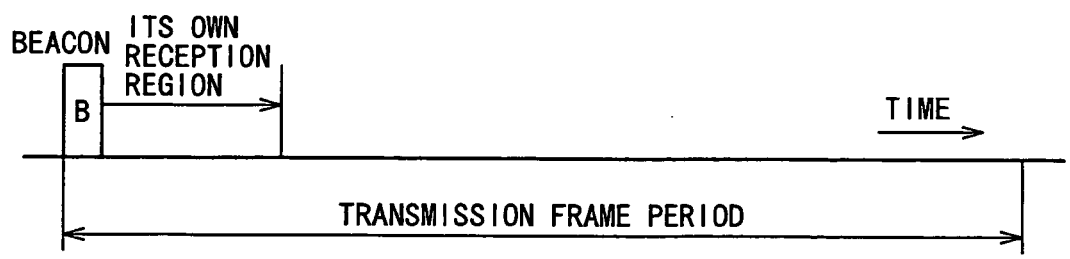
FIG. 2 is a drawing illustrating a structural example of a transmission frame period used in the wireless communication system regarding an embodiment of the present invention.

FIG. 2 shows an example of a frame structure used in the wireless communication system of the embodiment.

The frame structure shown in the drawing is defined by the transmission of a beacon signal (B) from each wireless communication apparatus, wherein a transmission frame period and a different offset timing are set for each wireless communication apparatus. That is, each wireless communication apparatus is set to have a different beacon transmission position to transmit a beacon with mutually avoiding collisions to form an autonomous distributed type of Ad Hoc wireless network. The beacon signal may have description of various types of information to control the communication operation at the communicable area of the wireless communication apparatus.

Figure 3:
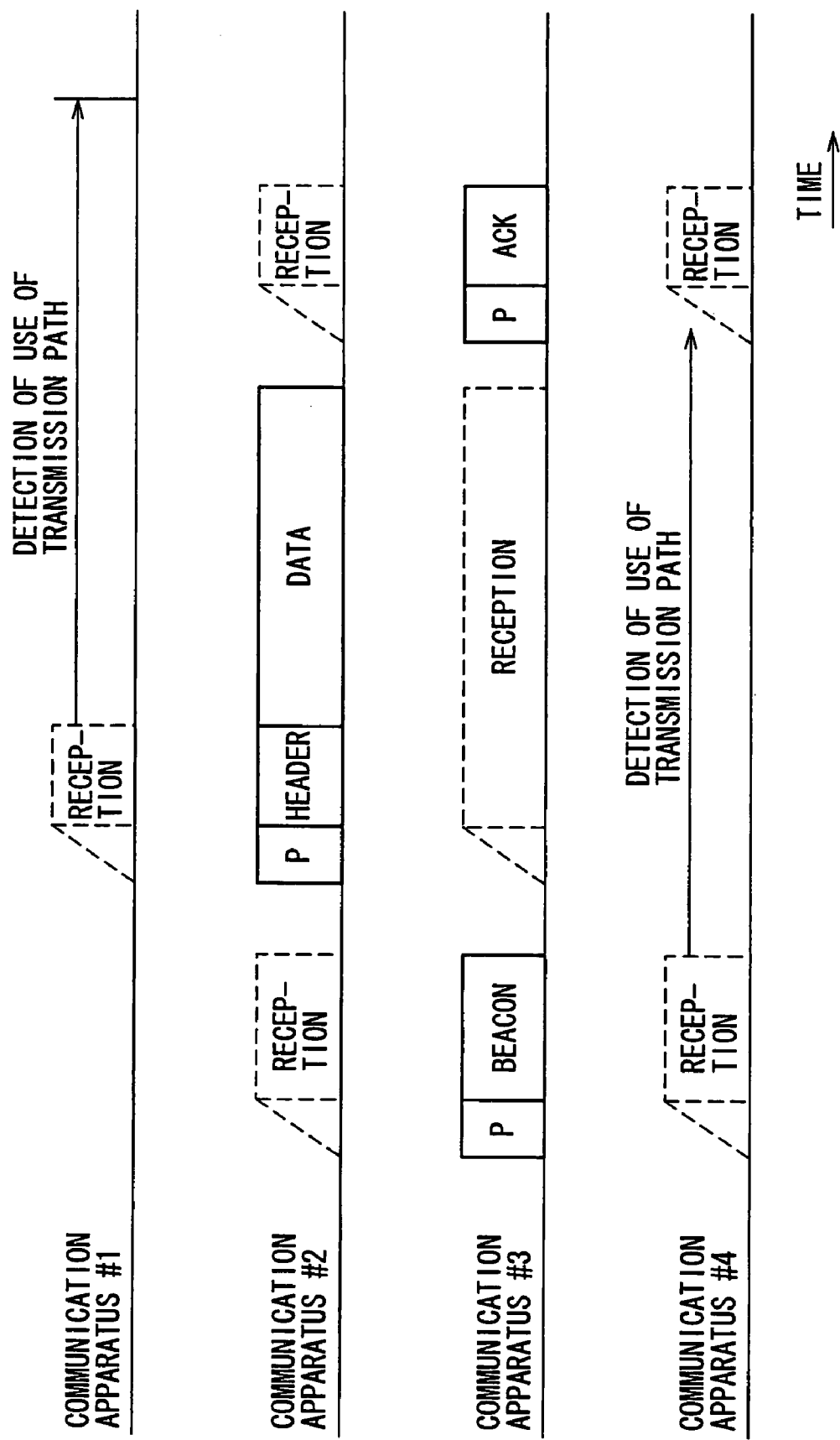
FIG. 3 is a drawing illustrating an operation example of a communication sequence when a prioritized transmission source is specified.

FIG. 3 shows an operation example of the communication sequence when a prioritized transmission source is specified. The example shown in the same drawing illustrates the sequence capable of communication with eliminating the complicated connection procedure by that a communication apparatus as an information reception target specifies the communication apparatus effecting a prioritized transmission just after own beacon signal.

In the drawing, the communication apparatuses #1, #2, #3, and #4 are arranged, and the communication apparatus #1 is communicable with the adjacent communication apparatus #2. The communication apparatus #2 is communicable with the adjacent communication apparatuses #1 and #3. The communication apparatus #3 is communicable with the adjacent communication apparatuses #2 and #4. The communication apparatus #4 is communicable with the adjacent communication apparatus #3. Further, the communication apparatus #4 is not audible to the communication apparatus #2, and the communication apparatus #1 is not audible to the communication apparatus #3. Thus, they are hidden terminals for each other.

When the beacon signal is transmitted from the communication apparatus #3, the adjacent communication apparatuses #2 and #4 receive it. Then, the communication apparatus #2 specified as the prioritized transmission target can transmit the data.

As this time, the communication apparatus #4, a hidden terminal viewed from the communication apparatus #2, detects the use of the transmission path using the beacon signal to execute a control without transmission until the termination of this communication. More specifically, the communication apparatus #4 detects that another communication apparatus #2 is specified as the prioritized transmission source on the basis of the beacon signal from the communication apparatus #3 to recognize that the transmission path is used up to the detection of the ACK packet for the transmission data from the communication apparatus #2.

Further, the communication apparatus #1 is a hidden terminal viewed from the communication apparatus #3 and thus, cannot receive the beacon signal, but can similarly detect the use of the transmission path on the basis of the preamble signal added to the top of the data packet according to the data transmission by the communication apparatus #2 to execute a control of non-transmission until the termination of this communication.

As shown in FIG. 3, a preamble signal is always added to top of the beacon signal, the data packet, and the ACK packet. In the drawing, the parts designated with "P" correspond the preamble. Addition at the start of transmission of each signal enables the communication apparatuses to detect the use of the transmission path by adjacent communication apparatuses.

The preamble signal is generally formed with the known string information and transmitted, so that it can be more easily received than the net transmission data. Thus, the communication apparatuses at the communicable area can surely detect this. This is also applicable to the Ultra Wide Band communication having no carrier of a specific frequency.

In the operation sequence example shown in FIG. 3, the judgment of the termination of the communication is triggered by the release of the transmission path caused by the return of the ACK from the communication apparatus #3, and in addition, it can be done by approximately calculating the termination time of the communication from the information described at the header part of the data. Alternatively, it may be judged by no detection of the preamble over a predetermined interval.

Figure 4:
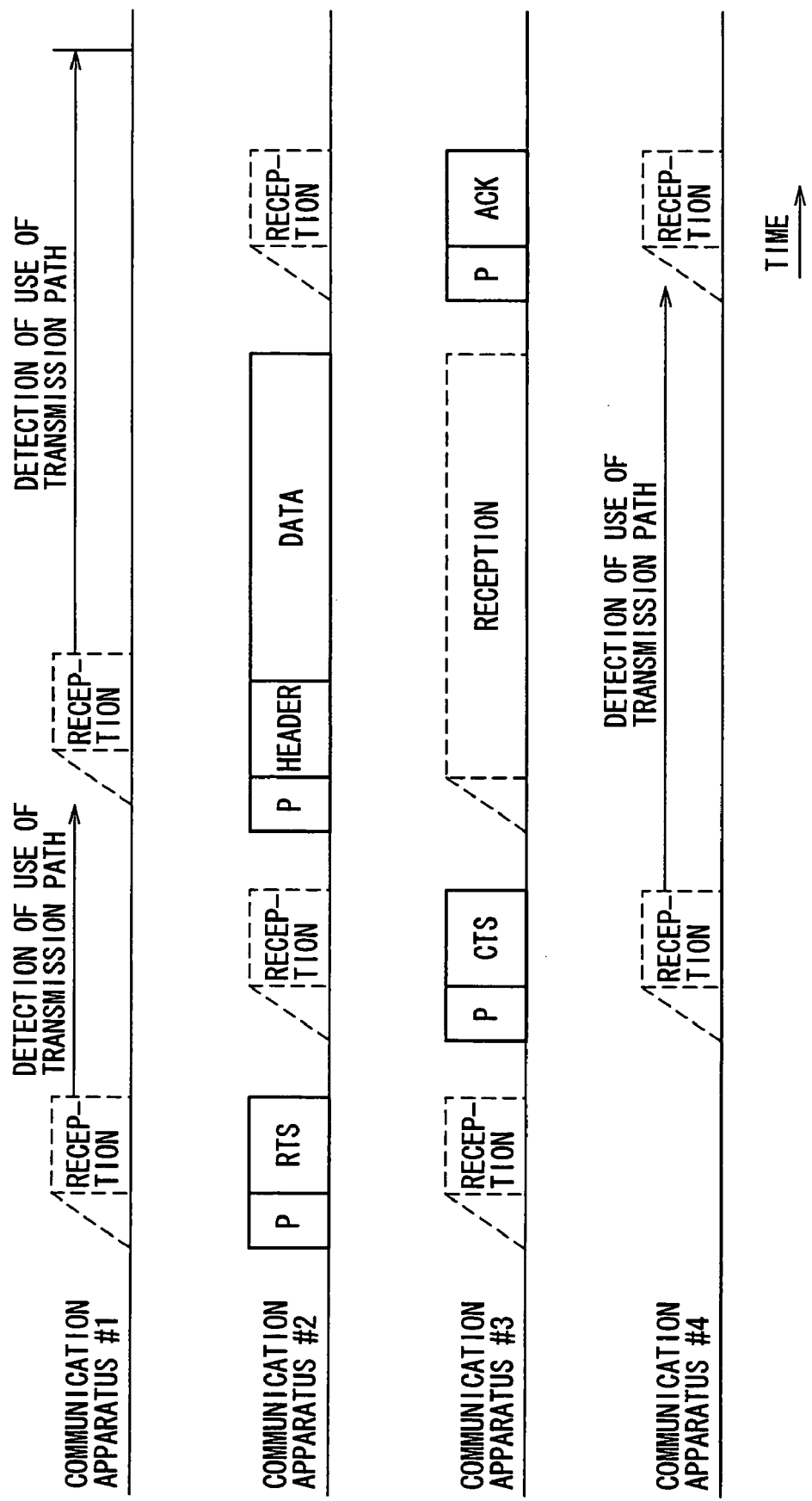
FIG. 4 is a drawing illustrating a communication sequence when a prioritized transmission source is not specified.

FIG. 4 illustrates an operation example of the communication sequence when no priority transmission source is specified. In the example shown in the same drawing, the communication apparatus as the information reception target transmits a transmission request (RTS), and the communication apparatus as the reception target returns the confirmation notice (CTS) with informing the communication apparatus at the position showing a possibility of a hidden terminal about the use of the wireless transmission path to execute the data communication.

In the drawing, it is assumed that the communication apparatuses #1, #2, #3, and #4 are in the same position relation as that in FIG. 3. The communication apparatus #2 intending to transmit data transmits a transmission request (RTS) to the communication apparatus #3, and the communication apparatus #3 returns the confirmation notice (CTS) to the communication apparatus #2.

At this point, the communication apparatuses #1 and #4 at the positions showing a possibility of making them hidden terminals viewed from both the communication apparatuses #2 and #3 execute controls without transmission, respectively, up to the termination of the communication by detection of the use of the transmission path.

More specifically, the communication apparatus #1 detects the start of the data transmission of which transmission source is another communication apparatus #2 on the basis of the RTS packet to obtain the timings of the data transmission of the net data and the return of the corresponding ACK packet to recognize that the transmission path is used for the interval. Further, the communication apparatus #4 detects the start of data transmission of which reception target is another communication apparatus #3 on the basis of the CTS packet to recognize that the transmission path is used up to the detection of the return of the ACK packet from the communication apparatus #3.

As shown in FIG. 4, a preamble signal is always added to the RTS packet, the CTS packet, a data packet, and an ACK packet. In the drawing, the parts designated with "P" correspond the preamble. Sure addition at the start of transmission of each signal enables the adjacent communication apparatuses to detect the use of the transmission path. The preamble signal is generally formed with the known string information and transmitted, so that it can be more easily received than the net transmission data. Thus, the respective communication apparatuses at the communicable area can surly detect this. This is also applicable to the Ultra Wide Band communication having no carrier of a specific frequency.

In the operation sequence example shown in FIG. 4, the judgment of the termination of the communication is triggered by the release of the transmission path caused by the return of the ACK from the communication apparatus #3, and in addition, it can be done by approximately calculating the termination time of the communication from the information described at the header part of the data. Alternatively, it may be judged by no detection of the preamble over a predetermined interval.

Figure 5:
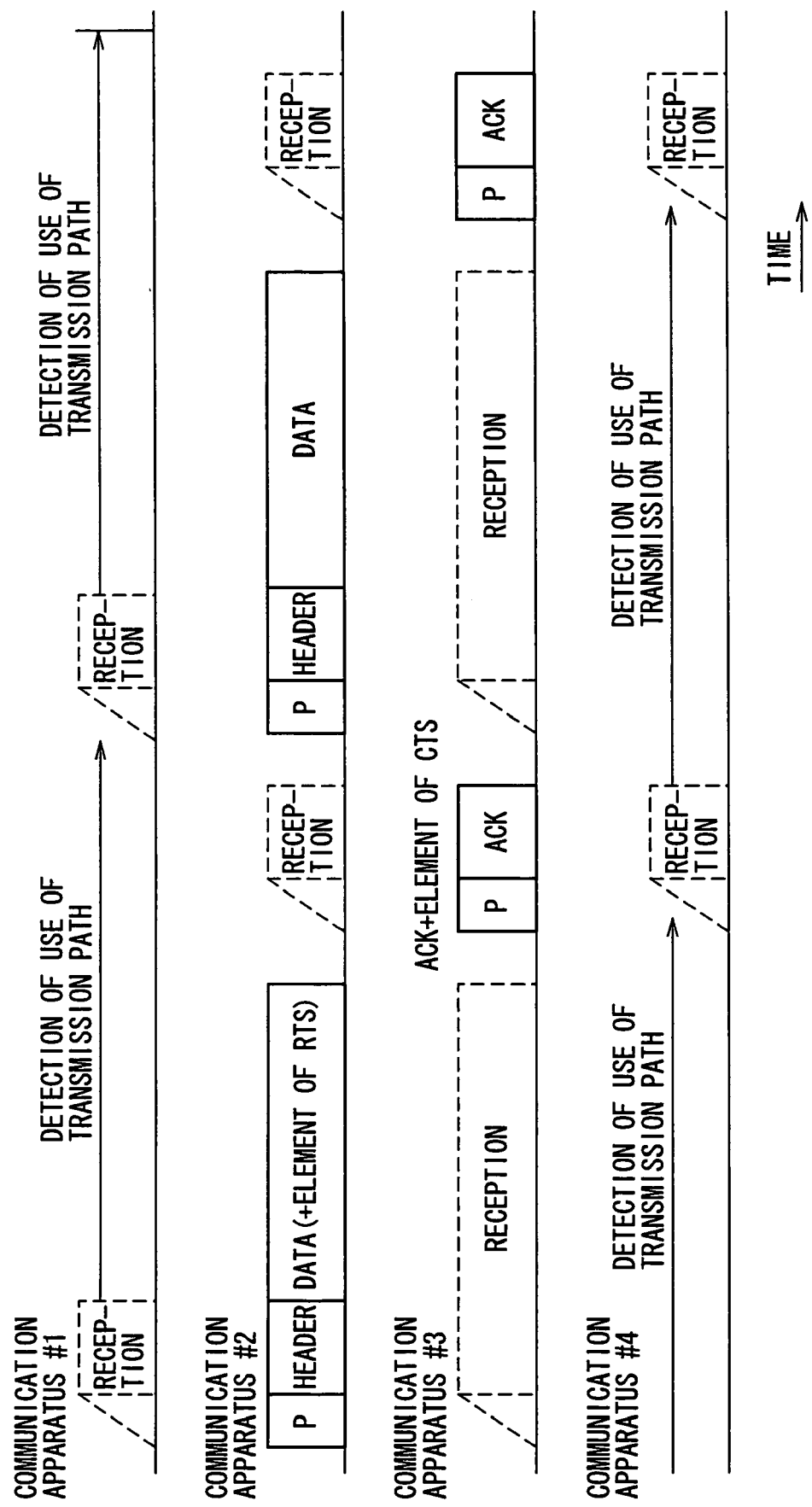
FIG. 5 is a drawing illustrating a communication sequence example in which data is continuously transmitted in the data transmission using a connection procedure on the basis of the RTS/CTS.

FIG. 5 illustrates a communication sequence example continuously transmitting data in the data transmission using the connection procedure on the basis of RTS/CTS. In the example of the same drawing, if a plurality of data packets are successively transmitted, the ACK information is once received from the reception target to inform the periphery about the successive use of the transmission path to continue the data transmission.

In the drawing, it is assumed that the communication apparatuses #1, #2, #3, and #4 are in the same position relation as that shown in FIG. 3. If the communication apparatus #2 executes the data transmission to the communication to the communication apparatus #3 in accordance with a predetermined access control, and if the data further continue, an element of the RTS is also added into the payload (data body) or the header information for the next data transmission.

On the other hand, the communication apparatus #3 side returns an ACK (or NACK) packet to the communication apparatus #2 after the completion of the data packet. Then, the element of the CTS included in the ACK information is returned, which enables the communication apparatus #2 to successively transmit the data.

At this point, the communication apparatus #4 as a hidden terminal viewed from the communication apparatus #2 receives the ACK including the element of the CTS to hold the continuation of the communication directed to the communication apparatus #3 to detect the use of the transmission path to execute a control without transmission until the termination of the communication.

Further, because the communication apparatus #2 continues to transmit the data transmission, the communication apparatus #1 as a hidden terminal viewed from the communication terminal #3 receives the data packet including the element of the RTS to similarly detect the use of the transmission path to execute a control without transmission until the termination of the communication.

When the communication apparatus #2 does not transmit data including the element of the RTS or when the communication apparatus #3 returns a pure ACK including no element of the CTS, the continuous communication terminates finally. The judgment of the termination of the communication is, as shown in the drawing, triggered by the release of the transmission path caused by the return of the ACK from the communication apparatus #3, and in addition, it can be made by approximately calculating the termination time of the communication from the information described at the header part of the data packet. Alternatively, it may be judged by no detection of the preamble over a predetermined interval.

As shown in FIG. 5, the preamble signal is always added to the top of the data packet or the ACK (or NACK) packet. In the drawing, the parts of designated with "P" correspond the preamble and the addition at the start of transmission of each signal enables the communication apparatuses to detect the use of the transmission path by adjacent communication apparatuses. The preamble signal is generally made up of the known string information to be transmitted, so that it can be more easily received than the net transmission data. Thus, the communication apparatuses at the communicable area can surely detect this. This is also applicable to the Ultra Wide Band communication having no carrier of a specific frequency.

Further, as shown in FIG. 5, because the connection procedure between the transmission apparatus and the reception apparatus on the basis of the RTS/CTS can be included in the net data transmission or the corresponding ACK return if the data packet transmission continues, the redundancy in the connection procedure can be eliminated and the communication interval necessary for the same data transmission amount can be shorted.

Figure 6:
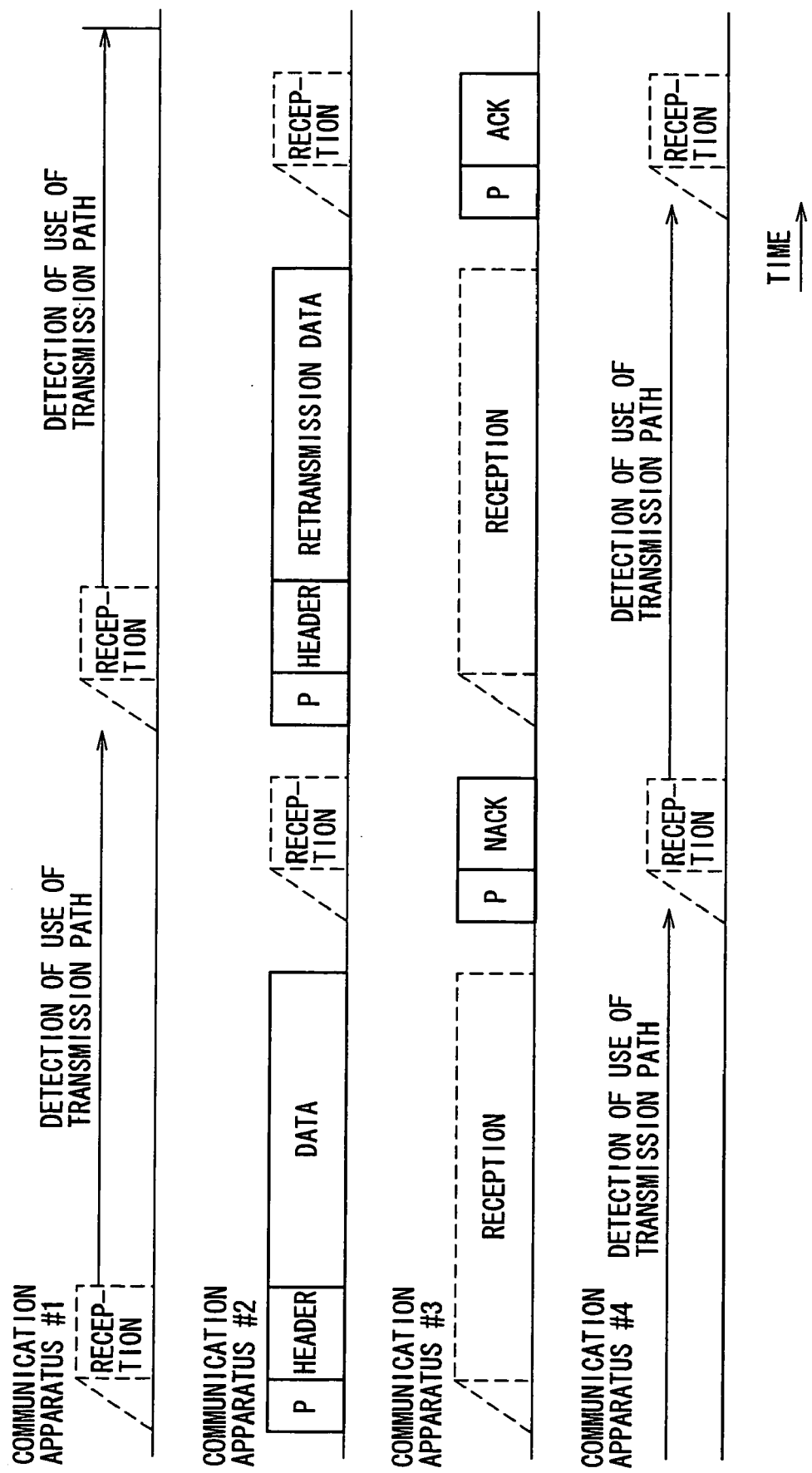
FIG. 6 is a drawing illustrating an operation sequence example of data retransmission.

FIG. 6 shows an operation sequence example for the data retransmission. In the example shown in the same drawing, when the communication apparatus as a transmission source receives the NACK packet from the reception target, the periphery is informed of execution of the continued retransmission to continue the data retransmission.

In the drawing, when the communication apparatus #2 is transmitting a data packet to the communication apparatus #3 in accordance with the predetermined access control, and when the data includes an error at the communication apparatus #3, the NACK in formation is generated. After termination of the data, the NACK packet is returned to the communication apparatus #2 from the communication apparatus #3. Here, a preamble signal is added to the top of the NACK packet. The communication apparatus #2 receiving the NACK information can continue the data retransmission.

During this, the communication apparatus #4, a hidden terminal with respect to the communication apparatus #2, holds the continuation of the retransmission to the communication apparatus #3 by receiving the NACK packet to detect the use of the transmission path and executes a control without transmission until the termination of the communication. More specifically, on the basis of the NACK packet, the start of the data retransmission of which reception target is another communication apparatus #3 is detected, and thus it is possible to recognize that the transmission path has been used until the return of the ACK packet from the communication apparatus #3 is detected.

Further, the retransmission of the data from the communication apparatus #2 causes the communication apparatus #1, which is a hidden terminal from the communication apparatus #3, to similarly detect the use of the transmission path on the basis of the preamble signal added to the top of the data packet to execute a control without transmission until the termination of the communication.

Then, the return of an AeCK packet from the communication apparatus #2 finally terminates the sequence communication. The judgment of the termination of the communication is triggered by that the transmission path is released by the return of the ACK packet from the communication apparatus #3 as shown in drawing and as well as may be made by approximately calculating the termination time of the communication from the information described at the header part of the data packet. Alternatively, the transmission termination can be judged by that the preamble signal is not detected for a predetermined interval.

As shown in FIG. 6, a preamble signal is always added to the top of the data packet, the ACK packet, and the NACK packet. In the drawing, the parts of designated with "P" correspond the preamble. Addition at the start of transmission of each signal enables the communication apparatuses to detect the use of the transmission path by an adjacent communication apparatus. The preamble signal is generally made up of the known string information to be transmitted, so that it can be more easily received than the net transmission data. Thus, the communication apparatuses at the communicable area can surely detect this. This is also applicable to the Ultra Wide Band communication having no carrier of a specific frequency.

Figure 7:
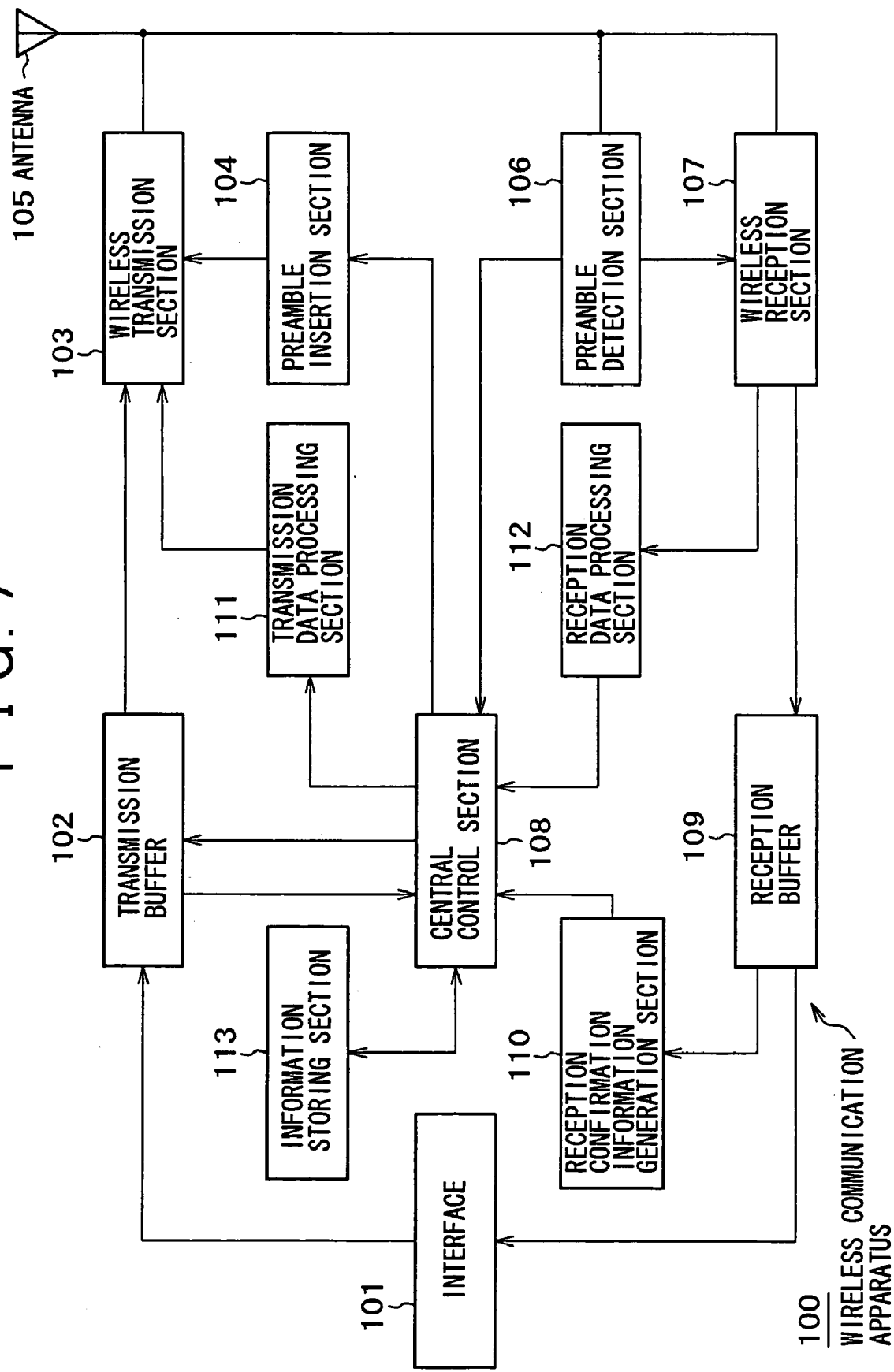
FIG. 7 is a drawing schematically illustrating a functional structure example of wireless communication apparatus capable of preferably operating in a wireless communication system regarding an embodiment of the present invention.

FIG. 7 schematically illustrates a functional structure example of a wireless communication apparatus capable of preferably operating in a wireless system regarding an embodiment of the present invention. The wireless communication apparatus shown in the drawing comprises an interface 101, a transmission buffer 102, a wireless transmission section 103, a preamble insertion section 104, an antenna 105, a preamble detection section 106, a wireless reception section 107, a central control section 108, a reception buffer 109, a reception confirmation information generation section 110, a transmission data processing section 111, a reception data processing section 112, and an information storing section 113.

The interface 101 interchanges various types of information with information processing units such as units connectable to the wireless communication apparatus (for example, a personal computer (PC) or an upper position application operative on the units).

The transmission buffer 102 fragmentizes the data transmitted from the unit or an upper position application via the interface 101 by a predetermined unit and temporarily stores the fragmentized data.

The wireless transmission section 103 executes a modulation process to obtain, for example, an ultra wide band signal to wirelessly transmit the data. The ultra wide band signal is formed with an impulse signal stream having an extremely short period about hundreds picoseconds. In this embodiment, no preamble signal is detected for a predetermined interval, the transmission operation of the data packet, a transmission request (RTS), or the beacon signal is started.

The preamble insertion section 104 adds a predetermined preamble signal to an ultra wide band signal, namely, adds it just before transmission of a packet. The preamble signal is generally formed with known string information to transmit it.

The antenna 105 wirelessly transmits a signal to another wireless communication apparatus and collects the signals from other wireless communication apparatuses. The antenna 105 may be of a transmission/reception type.

The preamble detection section 106 detects the preamble formed with the known stream added to the top of the ultra wide band signal collected by the antenna 105 at the timing instructed by the central control section 108.

The wireless reception section 107 receives the signals such as the data or a beacon signal transmitted from other wireless communication apparatuses. In this embodiment, the wireless receiving section 107 receives the signal added to the preamble signal in response to the detection of the preamble signal.

The central control section 108 integrally executes a sequence control in the sequence data communication and the access control of the wireless transmission path in accordance with the execution procedure instructions stored in the information storing section 113.

The reception buffer 109 stores the data received by the wireless reception section 107 and judges whether or not an error exists in the data.

The reception confirmation section 110 generates the ACK information when the data is correctly received and generates the NACK information when the data is incorrectly received. The central control section 108 transmits the ACK information and the NACK information to the transmission data processing section 111 to generate the ACK packet or the NACK packet.

The transmission data processing section 111 takes out the fragmentized data stored in the transmission buffer 102 to generate a transmission packet, a transmission request (RTS), and a confirmation notice (CTS), and the periodical beacon signal at a predetermined frame period. In the beacon signal, it is possible to describe specification of a prioritized transmission source.

The reception data processing section 112 analyses the data that can be received from other wireless communication apparatus. The reception data described here includes the beacon signal transmitted at a predetermined frame period from another communication apparatus, the data packet from the other wireless communication apparatus as a transmission source, the ACK packet from another wireless communication apparatus as a reception target, the confirmation notice (CTS) returned in response to the transmission request (RTS) packet, and the like. When the beacon signal is received, the prioritized transmission source information is analyzed.

The information storing section 113 stores the execution procedure instructions for the sequence operation and temporarily stores information regarding the access control.

FIG. 8 illustrates the structure of the beacon signal used in the wireless system regarding an embodiment of the present invention. The beacon signal shown in the drawing comprises a header information section and a payload information section after a predetermined preamble.

The header information section comprises an identifier indicative of a Beacon (Beacon), a data length of the information, the information of the transmission source, the information of the reception group, and the error detection information of the header (HCS: Head Check Sequence).

Further, to the payload information section, the specifying information of a prioritized transmission apparatus or the like set at needs is added, and error detection information (CRC: Cyclic Redundancy Code) of the payload is added at the most rear end.

FIG. 9 illustrates a structure of the data packet signal used in the wireless system regarding an embodiment of the present invention. The data packet in the drawing comprises a header information section and a payload information section after a predetermined preamble.

The header information section comprises an identifier indicative of the Data (Data), a data length of the information, information of a transmission source address, information of a reception target address, and error detection information of the header (HCS).

Further the payload information section comprises the data payload in which fragmentation is carried out by an information amount of a predetermined time unit. If the transmission of the data packets continues, it is possible to include an element of the RTS for next data transmission in the payload. Further, the element of the RTS can be included in the header information section (refer to FIG. 5).

FIG. 10 illustrates the structure of the ACK packet used in the wireless system regarding an embodiment of the present invention. The ACK packet shown in the drawing is made up only of a header information section following a predetermined preamble.

The header information section comprises an identifier indicative of a normal reception confirmation (ACK), a data length of the information, the information of the transmission source address, the information of the reception target address, and the error detection information of the header (HCS). Further, if the data packet transmission continues, it is possible to include an element of the CTS for the next data transmission (refer to FIG. 5).

FIG. 11 illustrates a structure of the NACK packet used in the wireless system regarding an embodiment of the present invention. The NACK packet shown in the drawing is made up only of the header information section following to a predetermined preamble.

The header information section comprises an identifier indicative of an error reception confirmation (NACK), a data length of the information, information of the transmission source address, information of the reception target address, and error detection information of the header (HCS).

FIG. 12 shows a structure of a transmission request (RTS) packet signal used in the wireless system regarding an embodiment of the present invention. The RTS packet shown in the drawing is formed only with a header information section following a predetermined preamble.

The header information section comprises an identifier indicative of the transmission request (RTS), a data length of the information, information of a transmission source address, information of a reception target address, and error detection information of the header (HCS).

FIG. 13 shows a structure of a confirmation notice (CTS) packet signal used in the wireless system regarding an embodiment of the present invention. The CTS packet shown in the drawing is formed only with a header information section following a predetermined preamble.

The header information section comprises an identifier indicative of the confirmation notice (CTS), a data length of the information, information of a transmission source address, information of a reception target address, and error detection information of the header (HCS).

Figure 14:
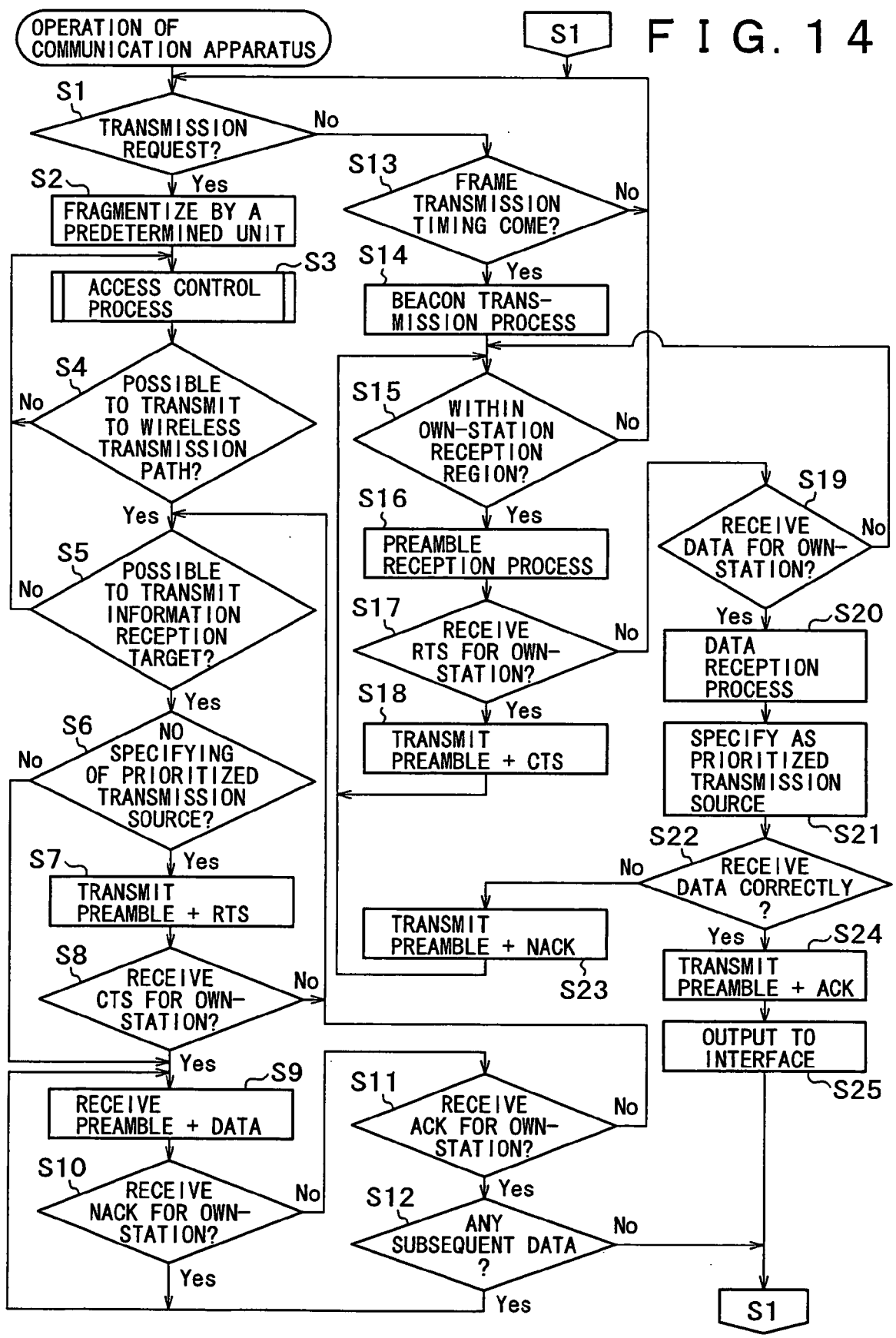
FIG. 14 is a flow chart illustrating an operation procedure executed within the wireless system by the wireless communication system shown in FIG. 7.

FIG. 14 shows an operational procedure executed within the wireless system by the wireless communication system shown in FIG. 7 in the form of a flow chart. This operation procedure is actually provided in the condition that the central control section 108 executes the execution procedure instructions stored in the information storing section 113.

In the interface 101 of the wireless communication apparatus, it is judged whether a transmission request of the data is received from a unit externally connected with the interface 101 of the wireless communication apparatus (or an upper layer application activated on the unit)(step S1).

When the data transmission request is detected, the data is fragmentized by a predetermined unit to store the data in the transmission buffer 102 (step S2).

After this, via a predetermined access control process (step S3), it is judged whether the transmission data in the transmission buffer 102 can be transmitted to the wireless transmission path.

Here, if communication by another communication apparatus is carried out within the communicable area of the wireless communication apparatus, a predetermined access control process (step S3) is continued. If no other communication apparatus carried out communication, it is in the condition that the transmission to the wireless transmission path is possible. The detailed description about the access control process will be made later.

Next, the beacon signal from the information reception target is received to judge whether the reception region comes (step S5). Here, when the reception region does not come, the processing returns to step S3 to try the predetermined access control process again.

If it is clear from the reception of the beacon signal that it is within the reception region of the information reception target, it is judged whether own station is specified as a prioritized transmission source (step S6). If own station is specified as a prioritized transmission source, the processing proceeds to step S9 to transmit the data (Data) packet to which a preamble signal is added.

On the other hand, if it is not specified as the prioritized transmission target, the preamble+transmission request (RTS) signal is transmitted to the reception target communication apparatus (step S7). After this, only when a for-own station confirmation notice (CTS) packet (step S8), the data packet to which a preamble is added is transmitted (step S9).

Here, if the for-own station confirmation notice (CTS) for the RTS packet transmitted by own station is not received (step S8), the processing returns to step S5 to repeat the transmission process for the RTS after it is confirmed again as to whether it is within the information transmission region.

After the transmission of the data, when the for-own-station NACK information is received (step S10), the processing returns to step S9 to execute retransmission of the data.

Further after the transmission of the data, when the for-own-station ACK information is received (step S11), it is judged whether transmission data exist continuously in step S12. If the transmission data exist continuously, the processing proceeds to the step S9 to take out the fragmentized next data from the transmission buffer 102 to execute the data transmission.

Here, if no continuous data exist, the sequence data transmission processing is terminated and the processing returns to the first step S1.

Further, if neither the ACK packet nor the NACK packet are received within a predetermined reception confirmation interval, the processing branches off from "No" in step S11 and returns to step S5, where it is confirmed again whether the information transmission region comes, and then, the transmission process for the RTS is executed to effect data retransmission (ditto).

When receiving no data transmission request in the judgment in step S1, this wireless communication apparatus judges whether the top timing of a transmission frame period comes (step S13). When the top timing of a transmission frame period comes, a beacon is transmitted (step S14). After this, it is judged whether it exists within own reception region (step S15).

Here, if it is not the top timing of a frame period, or it is outside own reception region, the processing returns to step S1.

Further, if it is within own reception region, a predetermined preamble signal reception processing is executed (step S16).

At this point, if a for-own-station transmission request (RTS) packet is received (step S17), the confirmation notice (CTS) packet to which a preamble is attacked just after its end is returned (step S18).

Further, if a for-own-station data (Data) packet is received (step S19), a data reception of a predetermined unit is executed (step S20). Here, it is possible to adopt the structure that the wireless communication apparatus as a transmission source of the for-own-station data is specified as a prioritized transmission source (step S21).

It is judged whether the data is correctly received using the CRC at the end (step S22). If the data cannot be received, the NACK packet to which a preamble is attacked just after its end is returned (S23). After that, the processing returns to step S15 to continue the reception process again.

On the other hand, if the data is correctly received (step S22), the ACK packet to which a preamble is attacked just after its end is returned (step S24). Then, the received data is supplied to an externally connected device through the interface 102 (or the upper layer application) (step S25), and the sequence data reception process terminates. After that, the processing returns to the first step S1.

Further, if no reception of for-own station data (step S19), the processing returns to step S15 again to continue to execute these sequence reception processes only when it exists within the own-station region.

Figure 15:
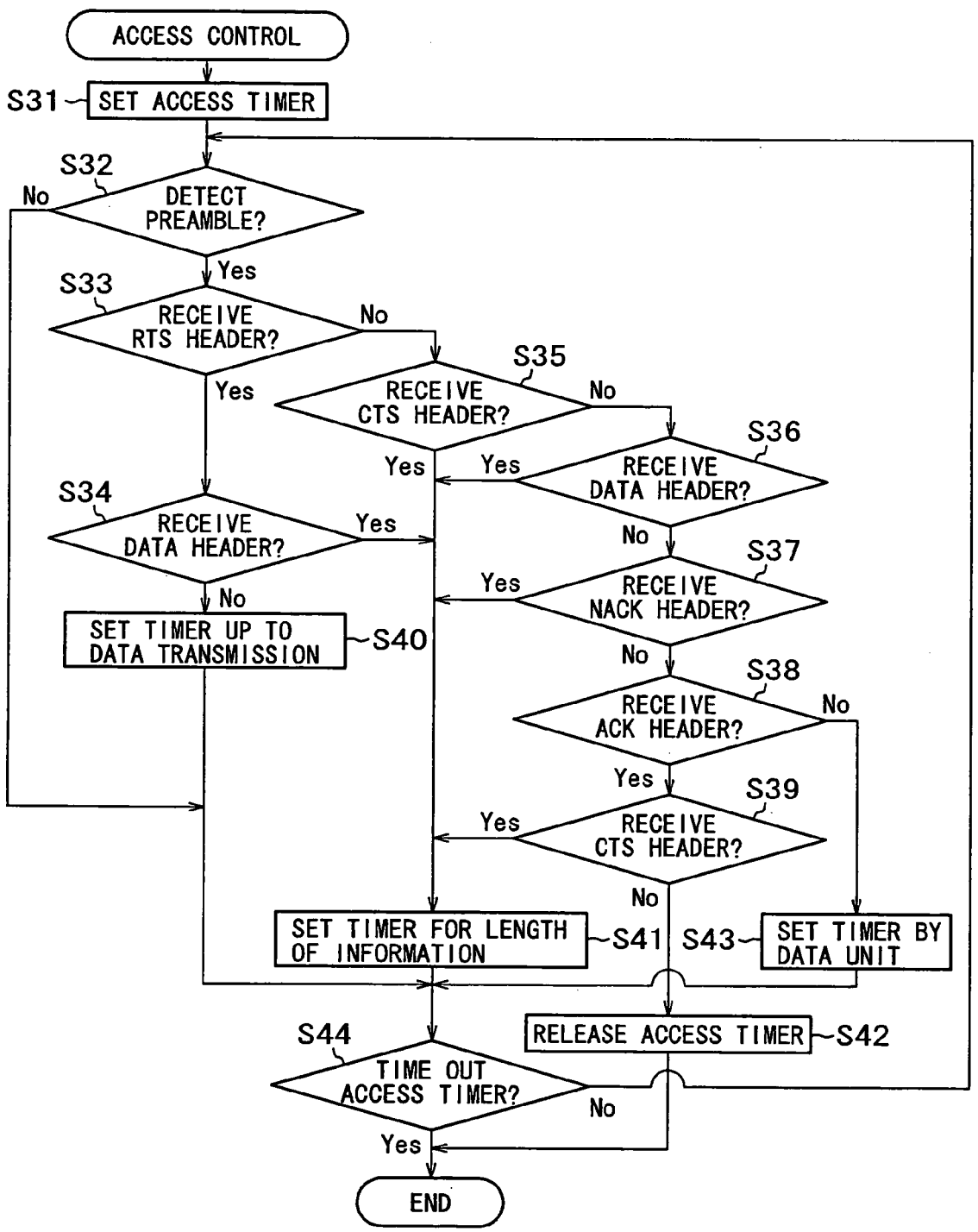
FIG. 15 is a flow chart illustrating a detailed procedure of the access control corresponding to step S3 in FIG. 14.

FIG. 15 shows a detailed procedure of the access control process corresponding to the step S3 in FIG. 14 in a flow chart format.

First, time corresponding to the time unit of predetermined fragmentized data is set to an access timer (step S31). Then, it is judged whether the preamble signal is detected (step S32). If it is detected, then, the header part is decoded.

Next, it is judged whether the RTS header is received (step S33). If the RTS header is received, successively it is judged whether Data header is included (step S34).

If the Data header is included, the time corresponding to the data length of the data is set to the access timer (step S41), and the control is effected to execute no transmission operation with the recognition that the transmission path is used for the interval up to time out (step S41).

On the other hand, if no Data header is included, the time up to the Data timing expected to be subsequently transmitted is set to the access timer (step S40).

Further, other than the RTS header, if the CTS header is received (S35), time corresponding to the data length of the data is set to the access timer (step S41), the control is effected to execute no transmission operation with the recognition that the transmission path is used by hidden terminals for the interval up to time out (step S41).

Further, other than the RTS header and the CTS header, if Data header is received (step S36), the time corresponding to the data length of the data is set to the access timer (step S41).

Further, other than the RTS header, the CTS header and the Data header, if the NACK header is received (S37), time corresponding to the data length of the data is set to the access timer (step S41), the control is effected to execute no transmission operation with the recognition that the transmission path is used by hidden terminals for the interval up to time out.

If no, and if the ACK header is received (step S38), successively it is judged whether the CTS header is included (step S39). If the CTS header is included, time corresponding to the data length of the data is set to the access timer (step S41), the control is effected to execute no transmission operation with the recognition that the transmission path is used for continuous data transmission for the interval up to time out. On the other hand, if no CTS header is included, the setting in the access timer as a target of the ACK is released (step S42), and the sequence access control process is terminated and the processing exits the subroutine.

Further, if no header is received after the detection of the preamble signal, the time corresponding to the time unit of the predetermined fragmentized data is set to the access timer (step S43).

After that, if no preamble signal is detected and if a timer value is newly set, it is judged whether the access timer become "time out" (step S44). Then, if in case of "time out", the sequence access control process is terminated and the processing exits the subroutine.

If the access timer does not become "time out", the processing returns to step S32, where the above-mentioned sequence process is repeated depending on whether a new signal is received up to time when the set timer becomes "time out".

In this embodiment, as described above, the preamble signal is always attacked to the top of a packet. The regularly attachment at the transmission start of each signal provides the detection of the use of the transmission path by the peripheral communication apparatuses. The preamble signal, generally transmitted with the structure including known string data, can be easily received, so that each communication apparatus within the communicable region can surly detect it.

Appendix

As described above, the present invention is described in detail with reference to the specific embodiment. However it is obvious that the person in the art can make modification or replacement within the region without departing from the subject of the present invention. That is, the present invention has been disclosed in an exemplary mode and should not be interpreted restrictively. To judge the subject matter of the present invention, Claims should be referred.

INDUSTRIAL APPLICABILITY

According to the present invention, a superior wireless communication method, a superior wireless communication apparatus, a superior wireless communication method, and a superior computer program, capable of a preferable access control with avoiding collision of communication and a retransmission control in the ultra-wide band communication system are provided.

Further, according to the present invention, there are provided a superior wireless communication method, a superior wireless communication apparatus, a superior wireless communication method, and a superior computer program, capable of a preferable access control or a preferable retransmission control with holding the use condition of the transmission path for the data communication or retransmission between other communication terminals by currently non-communicating communication apparatuses.

According to the present invention, it is surly specified that when the data is correctly received, the ACK information is returned, and if the data is not correctly received, the NACK information is returned. This provides the communication method capable of informing peripheral communication apparatuses about the repeatedly use of the transmission path.

Further, according to the present invention, transmitting a beacon signal describing the information of the wireless communication apparatus of which transmission is prioritized preferably avoids collisions among communication apparatuses without using previously interchanging the transmission request (RTS) and the confirmation notices (CTS) before the data communication.

Further, according to the present invention, if a plurality of fragmentized data pieces are transmitted, transmitting data packet of the next unit after the reception of the ACK packet for the data packet preferably prevents occurrences of collisions during continuously use the transmission path.

Further, according to the present invention, if no prioritized transmission is permitted, or if the ACK cannot be received, the use of the procedure of exchanging the transmission request (RTS) and the confirmation notice (CTS) preferably avoids collisions among the communication apparatuses.

The invention claimed is:

1. A wireless communication system operating without a base station and including a plurality of communication apparatuses associated with respective communication areas, the system comprising:
   an information transmission source communication apparatus for forming a data packet by inserting a preamble signal into each transmission data and transmitting the formed data packet to a receiving destination communication apparatus over a transmission path, the receiving destination communication apparatus being one of the communication apparatuses that are located within the communication area of the transmission source communication apparatus,
      wherein a preamble signal is inserted in each transmission packet transmitted between the transmission source communication apparatus and the receiving destination communication apparatus so as to be integral with each transmission data, wherein said transmission packet being at least one of a beacon signal, a data packet, an acknowledgment packet, a negative acknowledgment packet, a transmission request packet, and a confirmation notice packet,
      wherein said transmission packet contains error detection information for header information in said transmission packet, wherein said beacon signal and data packet contain error detection information for payload information in respective beacon signal and data packet; and
   at least one of the plurality of communication apparatuses not currently communicating for recognizing that the transmission path is used for a predetermined interval by the transmission source communication apparatus and the receiving destination communication apparatus from a time when a preamble signal from a transmission packet is detected.

2. The wireless communication system as claimed in claim 1, wherein
   the information transmission source communication apparatus forms the data packet at a predetermined time unit, and further comprising:
   an information reception target communication apparatus for generating acknowledge (ACK) information in response to the success in correctly receiving the data and for generating not acknowledge (NACK) information in response to a failure in correctly receiving the data, forms an ACK or NACK packet to which a preamble signal is inserted, and returns it, just after the reception of the data packet;
   said information transmission source communication apparatus retransmits the data packet of said predetermined time unit in response to the reception of the NACK packet; and
   said communication apparatus not currently communicating recognizes a use of the transmission path for retransmission based on the reception of the preamble signal for a period from the detection of the NACK packet to detection of the next ACK packet.

3. The wireless communication system as claimed in claim 2, wherein
   other communication apparatuses not currently communicating recognize the termination of the use of the transmission path when the ACK packet cannot be detected based on the detection of the preamble signal until a predetermined elapsed time from when the NACK packet is received.

4. The wireless communication system as claimed in claim, 2 wherein
   the information reception target communication apparatus adds the preamble signal to a top of a beacon signal describing information regarding a communication apparatus of which transmission is permitted with priority, and transmits the beacon signal;
   the communication apparatus specified by the beacon signal transmits a predetermined unit of data packet when there is data to be transmitted to said information reception target apparatus; and
   other communication apparatuses not currently communicating recognize based on the detection of the preamble signal the use of the transmission path for the time interval corresponding to the packet length from when said beacon signal is received.

5. The wireless communication system as claimed in claim, 2 wherein
   said information transmission source communication apparatus transmits a transmission request packet (RTS) into which the preamble signal is inserted when no preamble signal is detected for a predetermined time interval; and
   said information reception target communication apparatus returns a confirmation notice packet (CTS) in response to the reception of a transmission request packet (RTS).

6. The wireless communication system as claimed in claim 5, wherein
   said other communication apparatus not currently communicating recognizes based on the detection of the preamble signal the use of the transmission path from when the NACK packet is detected, during a predetermined interval from the reception of the confirmation notice (CTS) packet, to when the next ACK packet is detected.

7. The wireless communication system as claimed in claim 5, wherein
   said information source communication apparatus makes the data packet include therein an element of the transmission request (RTS) for a next data packet transmission when transmission data exists.

8. The wireless communication system as claimed in claim 5, wherein
   said information reception target communication apparatus makes the ACK packet or the NACK packet corresponding to the received data packet include an element of confirmation notice (CTS).

9. A wireless communication apparatus operating within a communication system not having a base station and including a plurality of communication apparatuses associated with respective communication areas, the apparatus comprising:
   buffer unit for dividing transmission data by a predetermined unit;

transmission data processing unit for adding a predetermined preamble signal to divided transmission data from the buffer unit to form a transmission packet, wherein said transmission packet being at least one of a beacon signal, a data packet, an acknowledgment packet, a negative acknowledgment packet, a transmission request packet, and a confirmation notice packet, wherein said transmission packet contains error detection information for header information in said transmission packet, wherein said beacon signal and data packet contain error detection information for payload information in respective beacon signal and data packet;

preamble detection unit for detecting a preamble signal on a transmission path; and transmission unit for transmitting the formed packet when no preamble signal is detected for a predetermined interval at said preamble detection unit, the formed packet being transmitted over a transmission path to one or more communication apparatuses within the communication area of the wireless communication apparatus transmitting the packet, whereby at least one of the plurality of communication apparatuses not currently communicating recognizes that the transmission path is used for a predetermined interval by another communication apparatus from a time when a preamble signal from a transmission packet is detected.

10. The wireless communication apparatus as claimed in claim 9, further comprising:

reception unit for receiving a signal added to the preamble signal in response to the detection of the preamble signal; and reception data processing unit for analyzing the signal received by said reception unit.

11. The wireless communication apparatus as claimed in claim 10, wherein said reception data processing unit generates acknowledge (ACK) information in response to correctly receiving a for-own-station data and not acknowledge (NACK) information in response to incorrectly receiving the for-own-station data;

said transmission data processing unit forms an ACK packet or an NACK packet into which a preamble signal is inserted; and said transmission unit transmits the ACK packet or the NACK packet just after the reception of the data.

12. The wireless communication apparatus as claimed in claim 11, wherein upon not currently communicating, said reception data processing unit recognizes use of the transmission path for the data retransmission from when the NACK packet is detected to when the next ACK packet is detected.

13. The wireless communication apparatus as claimed in claim 11, wherein said reception data processing unit recognizes a termination of use of the transmission path when no ACK packet is detected until a predetermined interval has elapsed from when the NACK packet is received.

14. The wireless communication apparatus as claimed in claim 10, wherein said transmission data processing unit generates a beacon signal describing information regarding a communication apparatus from which transmission is permitted with priority; and said reception data processing unit analyzes whether the transmission of its own station is permitted with priority by analyzing the beacon signal.

15. The wireless communication apparatus as claimed in claim 14, wherein upon not currently communicating, said reception data processing unit recognizes use of a transmission path for a time interval corresponding to the packet length from when the beacon signal is received.

16. The wireless communication apparatus as claimed in claim 10, wherein said transmission data processing unit generates a transmission request (RTS) packet for a data transmission target;

and in response to reception of the transmission request (RTS) packet from another communication apparatus by said reception processing unit, said transmission data processing unit generates a confirmation notice (CTS) packet.

17. The wireless communication apparatus as claimed in claim 16, wherein upon not currently communicating, said reception data processing unit recognizes use of a transmission path from when a not acknowledge (NACK) packet is detected, during a predetermined interval from the reception of the confirmation notice (CTS) packet, to when a next acknowledge (ACK) packet is detected.

18. The wireless communication apparatus as claimed in claim 16, wherein said transmission data processing unit makes the data packet include therein an element of the transmission request (RTS) for a next data packet transmission when a following transmission data exists.

19. The wireless communication apparatus as claimed in claim 16, characterized in that:

said transmission data processing unit makes an acknowledge (ACK) packet or a not acknowledge (NACK) packet corresponding to the received data packet include an element of the confirmation notice [CTS] therein.

20. A wireless communication method for use in a communication system not having a base station and including a plurality of a communication apparatuses associated with respective communication areas, the method comprising:

a buffering step for dividing transmission data by a predetermined unit;

a transmission data processing step for forming a transmission packet by adding a predetermined preamble signal to divided data from the buffering step, wherein a transmission packet being at least one of a beacon signal, a data packet, an acknowledgment packet, a negative acknowledgment packet, a transmission request packet, and a confirmation notice packet, wherein said transmission packet contains error detection information for header information in said transmission packet, wherein said beacon signal and data packet contain error detection information for payload information in respective beacon signal and data packet;

a preamble detection step for detecting a preamble signal on a transmission path; and a transmission step for transmitting the formed transmission packet when no preamble is detected for a predetermined interval in said preamble detection step, the formed packet being transmitted over a transmission path to one or more communication apparatuses within the communication area of a communication apparatus transmitting the packet, whereby at least one of the plurality of communication apparatuses not currently communicating recognizes that the transmission path is used for a predetermined interval by another communication apparatus from a time when a preamble signal from a transmission packet is detected.

21. The wireless communication method as claimed in claim 20, further comprising:
 a reception step for receiving a signal added to the preamble signal in response to the detection of the preamble signal, and
 a reception data processing step for analyzing information received by said reception step.

22. The wireless communication method as claimed in claim 21, wherein
 in said reception data processing step, in response to success in correctly receiving data directed to own station, acknowledge (ACK) information is generated, or in response to a failure in correctly receiving data directed to own station, not acknowledge (NACK), information is generated;
 in said transmission data processing step, an ACK packet or an NACK packet into which the preamble signal is inserted is formed, and
 in said transmission step, the ACK packet or the NACK packet is transmitted just after the data reception.

23. The wireless communication method as claimed in claim 22, wherein
 upon not currently communicating in said reception data processing step, it is recognized that the transmission path is used for data retransmission from when the NACK packet is detected to when a next ACK packet is detected.

24. The wireless communication method as claimed in claim 22, wherein
 in said reception data processing step, it is recognized that use of the transmission path is terminated when the ACK packet cannot be detected until a predetermined time has elapsed from when the NACK packet is received.

25. The wireless communication method as claimed in claim 21, wherein
 in said transmission data processing step, beacon signal describing information regarding the communication apparatus from which transmission is permitted with priority is generated; and
 in said reception data processing step, it is analyzed whether own transmission is permitted with priority by analyzing the beacon signal.

26. The wireless communication method as claimed in claim 25, wherein
 upon currently non-communicating, in said reception data processing step, it is recognized that a transmission path is used for the time interval corresponding to the packet length from when the beacon signal is received.

27. The wireless communication method as claimed in claim 21, wherein in said transmission data processing step, a transmission request (RTS) packet for the data transmission target is generated; or
 in said reception step, in response to the reception of a transmission request (RTS) packet from another communication apparatus, in said transmission data processing step, a confirmation notice (CTS) packet is generated.

28. The wireless communication method as claimed as claim 27, wherein
 upon currently non-communicating, in said reception data processing step, it is recognized that the transmission path is used from when a not acknowledge (NACK) packet is detected during a predetermined interval from the reception of the confirmation notice (CTS) packet to when a next acknowledge (ACK) packet is detected.

29. The wireless communication method as claimed in claim 27, wherein
 in said transmission data processing step, the data packet is made to include therein an element of the transmission request (RTS) for a next data packet transmission when a following transmission data exists.

30. The wireless communication method as claimed in claim 27, characterized in that:
 in said transmission data processing step, and acknowledge (ACK) packet or an not acknowledge (NACK) packet corresponding to the received data packet is made to include therein an element of the confirmation notice (CTS).

* * * * *